United States Patent [19]
Schliwa et al.

[11] Patent Number: 5,752,673
[45] Date of Patent: May 19, 1998

[54] PASSENGER AIRCRAFT WITH INCREASED PASSENGER CAPACITY

[75] Inventors: Ralf Schliwa, Dollern; Hans-Juergen Mueller, Henstedt-Ulzburg; Wilfried Sprenger, Issendorf, all of Germany

[73] Assignee: Daimler-Benz Aerospace Airbus GmbH, Hamburg, Germany

[21] Appl. No.: 437,548

[22] Filed: May 9, 1995

[30] Foreign Application Priority Data

May 10, 1994 [DE] Germany .................. 44 16 506.4

[51] Int. Cl.⁶ .................. B64C 01/06; B64C 01/10; B64C 01/20
[52] U.S. Cl. .................. 244/118.6; 244/118.1; 244/120
[58] Field of Search .................. 244/107, 118.1, 244/118.5, 118.6, 137.1, 137.2, 119, 120; 105/340, 344, 345, 422; 296/204

[56] References Cited

U.S. PATENT DOCUMENTS

| Re. 32,176 | 6/1986 | Vernon | 244/118.5 |
|---|---|---|---|
| 504,615 | 9/1893 | Pope | 105/340 |
| 3,517,899 | 6/1970 | Vernon | 244/118.5 |
| 4,066,227 | 1/1978 | Buchsel | 244/118.5 |
| 4,854,245 | 8/1989 | Platzer | 105/345 |
| 4,925,132 | 5/1990 | Zider | 244/118.6 |
| 5,474,260 | 12/1995 | Schwertfeger et al. | 244/118.5 |
| 5,496,000 | 3/1996 | Mueller | 244/118.5 |

FOREIGN PATENT DOCUMENTS

| 381655 | 9/1923 | Germany . |
|---|---|---|
| 2826619 | 12/1979 | Germany . |
| 3007733 | 9/1981 | Germany . |
| 3501887 | 7/1986 | Germany . |
| 4116524 | 11/1992 | Germany . |

OTHER PUBLICATIONS

Crashsimulationsrechnungen und Bauteilidealisierung für einen Luftfahrzeugunterboden (Crash Simulation Calculations and Component Idealization for an Aircraft Subfloor Section) Z. Flugwiss. Weltraumforschung 11, (1987) pp. 221–229.

Primary Examiner—Virna Lissi Mojica
Attorney, Agent, or Firm—W. G. Fasse; W. F. Fasse

[57] ABSTRACT

It is a problem in conventional aircraft having a fuselage of substantially circular cross-section, that a conventional lower deck would have an insufficient standing height for passengers if the lower deck were to be equipped as a passenger cabin space including seats, sleeping cabins, or other passenger service facilities. In the present aircraft, the lower deck floor (2, 2') is depressed or dropped at least in a certain area (14) that will form an aisle (16), so that the free height of the lower deck in the area of the depressed floor provides at least the normal standing height (HS) for a person. A module (15, 15') containing passenger service facilities is arranged in the lower deck area at least to one side of the depressed floor area. A modular construction provides a great flexibility and convenience in reconfiguring a lower deck from a cargo hold configuration to a passenger cabin configuration and vice versa.

20 Claims, 3 Drawing Sheets

FIG.1

PASSENGER AIRCRAFT WITH INCREASED PASSENGER CAPACITY

CROSS-REFERENCE TO RELATED APPLICATIONS

This application is related to copending U.S. Ser. No. 08/232,387, filed on Apr. 25, 1994, entitled "Multi-Deck Passenger Aircraft Having Impact Energy Absorbing Structures", and U.S. Ser. No. 08/183,995, filed Jan. 18, 1994, entitled "Aircraft Construction", both having overlapping inventors and a common assignee with the present application.

FIELD OF THE INVENTION

The invention relates to a passenger aircraft having a fuselage with an approximately circular cross-sectional shape, in which an increased passenger capacity and an improved layout flexibility is achieved.

BACKGROUND INFORMATION

Increasing the passenger transport capacity of aircraft has become a problem due to the ever-increasing volume of air travel passengers. Aircraft manufacturers have made intensive efforts toward solving this problem. For example, wide body aircraft having several decks arranged one above the other are known, wherein various passenger facilities, such as seating cabins, sleeping compartments, galleys, rest rooms, and the like can be arranged on all of the several decks. German Patent Laying Open Document 4,116,524 discloses an aircraft in which both an upper deck and a lower deck are used at least partially for passengers. Throughout the following discussion, the term "lower deck" refers to the deck of which the floor is closest to the fuselage belly. In order to provide a sufficient standing height or head room for passengers in the lower deck, as well as the upper deck, the known wide body aircraft has a fuselage with a substantially oval-shaped cross-section. For structural reasons, such an oval cross-section is not as desirable as a circular cross-section for the fuselage.

In known aircraft having an approximately circular fuselage cross-section, it is not possible to use the lower deck for passengers, because the free height available between the floor of the lower deck and the floor of the upper deck is generally insufficient for passengers. Instead, the floor of the lower deck is arranged at such a level in the fuselage to provide the greatest possible usable width of the lower deck floor, while simultaneously providing the free height required by standard freight containers. In other words, because such existing lower decks are dimensioned and arranged optimally as freight loading decks, a sufficient standing height for passengers or flight attendants cannot be achieved. Thus, it has been impossible for a long time to achieve the goal of providing passenger facilities in the lower deck of an aircraft having a substantially circular cross-sectioned fuselage of a conventional size, simply because a sufficient standing height for passengers could not be achieved, among other reasons.

German Patent Laying Open Document 3,501,887 discloses a cabin arrangement of an aircraft having a substantially circular cross-sectioned fuselage, in which an auxiliary floor to provide additional passenger seating is suspended from the fuselage above the main deck floor. U.S. Pat. No. 4,066,227 (Buchsel) also discloses an aircraft having a substantially circular cross-sectioned fuselage with a mezzanine upper deck arranged above the main deck. The mezzanine deck is supported on a pylon structure extending up from the main deck floor. Neither of these known aircraft structures using an upper auxiliary deck or mezzanine deck enables the lower deck, which is typically provided as a freight compartment, to be used for passenger seating and other passenger facilities.

OBJECTS OF THE INVENTION

In view of the above it is the aim of the invention to achieve the following objects singly or in combination:

to arrange the lower deck of a passenger aircraft having an approximately circular cross-sectioned fuselage in such a manner that a sufficient standing height for transporting passengers is achieved at least in certain areas of the lower deck, while simultaneously maintaining a functional freight loading system in the lower deck;

to provide an arrangement by which the lower deck of such an aircraft can be quickly and easily reconfigured to provide either passenger areas or freight storage areas or both, depending on the particular transport requirements at hand;

to provide a depressed or dropped floor portion in the lower deck of such an aircraft to form a passenger aisle having a sufficient standing height, while the major floor surface of the lower deck is at a proper height to provide an optimum width and height for loading standard freight containers;

to lower the entire lower deck floor of such an aircraft to provide passenger standing height in the lower deck, and to provide floor modules to be arranged on the lower deck floor as needed to achieve a proper width and height for a freight loading floor; and to provide measures for absorbing energy and increasing the safety of passengers present in the lower deck area in the event of a crash of such an aircraft.

SUMMARY OF THE INVENTION

The above objects have been achieved according to the invention in an aircraft of the above described general type having an approximately circular cross-sectioned fuselage with at least two decks arranged one above the other, namely an upper deck and a lower deck. The lower deck is adapted to receive a freight loading system for freight containers and/or passenger cabin modules and/or passenger service facilities. The lower deck floor of the lower deck essentially comprises a grid-like framework of lengthwise and crosswise girders on which floor panels and the typical functional components of the freight loading system, such as roller sets, are arranged. The lower deck floor is supported or braced against the fuselage belly, for example, by a supporting structure comprising supporting members. At least in a prescribed area, the lower deck floor is depressed or dropped so that at least a normal standing height of a passenger is provided in the lower deck space in the areas of the dropped or depressed floor portion.

It is especially advantageous according to the invention that the usable space within the aircraft can be optimized so that the lower deck selectively can be used as a cargo space and/or as a passenger space as needed, while providing both an optimal floor height for loading freight containers and a normal standing height in at least certain areas of passenger cabin spaces or passenger service facilities. Retaining the functional freight loading system in the lower deck achieves a great flexibility in the selectable arrangement of passenger spaces and freight loading spaces. In this manner, the seating capacity of the aircraft can be effectively increased whenever required, as long as a corresponding reduction in the freight loading capacity is possible. Reconfiguring the freight compartment into a passenger compartment can be carried out with minimal effort.

According to a particular embodiment of the invention, at least one cross-wise girder of the lower deck floor extends substantially in a U-shape in the depressed or lowered floor area, whereby the side shanks of the U-shape extend in the direction of the fuselage belly, and the center shank of the U-shape forms the depressed, substantially horizontal crosswise support member. All of the crosswise girders can be depressed in a U-shape between respective adjacent lengthwise girders, whereby the side shanks of each U-shape extend in a direction matching the extension direction of the under-floor support members. In this manner, the strength and integrity of the supporting structure is maintained despite the depressions or dropped portions in the lower deck floor. Furthermore, the various functional components of the freight loading system can be retained on the lower deck floor, so that a problem-free loading and transport of freight containers remains possible.

Further according to the invention, one or more lengthwise girders of the lower deck floor may also be depressed or dropped to provide a wider area having a dropped floor and thus a standing height for passengers. The freight loading elements of a freight loading system, such as roller sets, can be arranged on the lengthwise girders that have not been depressed. Insert elements may be inserted into the depressed area of the lower deck floor when it is to be used as a freight loading floor, whereby roller sets or the like can be mounted on the insert elements in the same plane as the rest of the roller sets on the freight loading floor. In this manner, the width of the depressed portion of the floor is not limited by the spacing between two adjacent lengthwise girders of the floor. Thus, it is possible to provide a relatively wide aisle for passengers and to arrange passenger seats in relatively large open spaces. On the other hand, it is a simple matter to convert the lower deck space from a passenger space to a freight space by inserting the insert elements into the depressed areas of the floor.

The invention further provides that an energy absorbing structural unit can be arranged outside of and below the fuselage belly in order to help protect a survival space in the lower deck when it is used for passenger transport, so as to increase the safety of the passengers in the lower deck.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
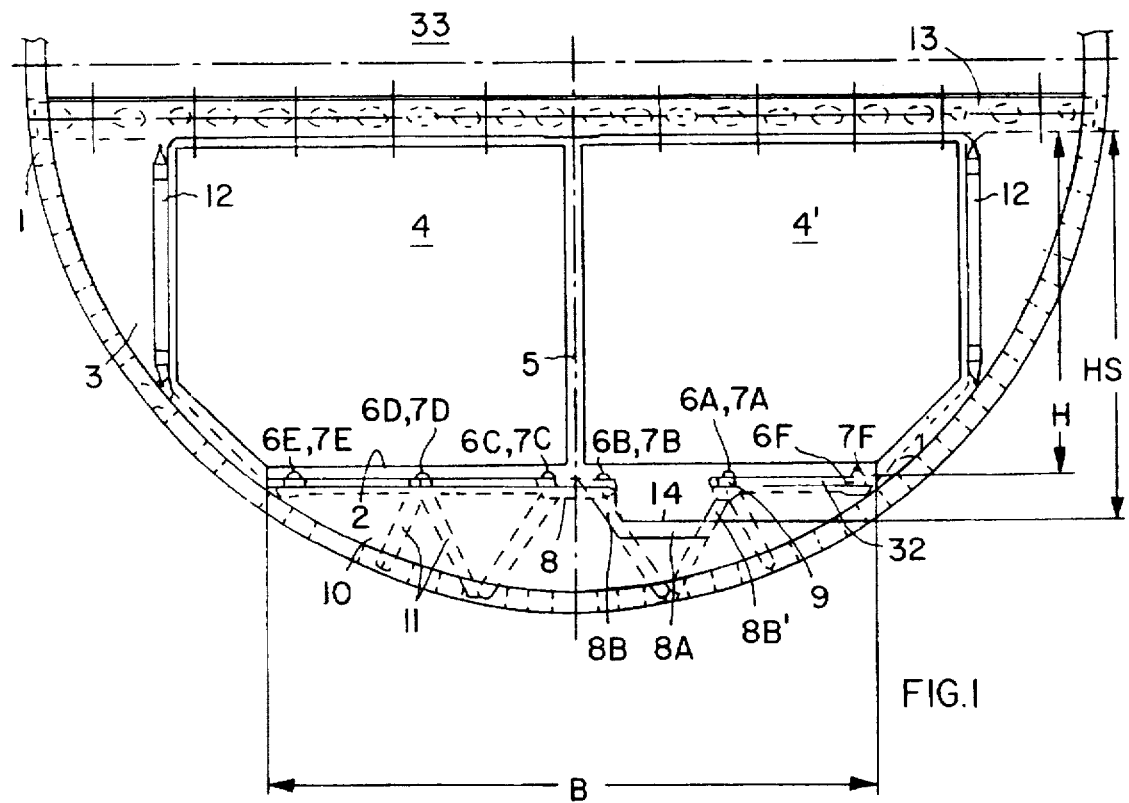
FIG. 1 is a cross-sectional view of a lower deck of an aircraft according to a first embodiment of the invention, wherein the lower deck contains standard freight containers.

As shown in the drawings, with particular reference to FIG. 1, an aircraft with a substantially circular cross-sectioned fuselage has a fuselage belly 1. The circular fuselage can have substantially any diameter, but especially has a diameter in the range of about 5.00 m–6.50 m, which is typical for current wide body aircraft having a circular cross-section. An upper deck 33 is defined within the fuselage above an upper deck floor structure 13. The upper deck 33 may be outfitted with passenger cabins, galleys, and other passenger service facilities in a conventional manner (see e.g. FIG. 5). A lower deck 3 is provided below the upper deck floor structure 13, whereby the lower deck floor 2 is the floor arranged closest to the fuselage belly 1.

The lower deck 3 is generally provided as a cargo hold or freight compartment 5 for transporting standard freight containers 4 and 4', as shown in FIG. 1, for example. The lower deck floor 2 is arranged deep enough in the fuselage belly 1, to provide a sufficient height H within the lower deck 3 to accommodate the freight containers 4 and 4' that are to be transported. By arranging the lower deck floor 2 as high as possible within the fuselage while still achieving the required height H, the greatest possible usable width B is achieved within the cargo hold or freight compartment 5. Particularly, the height H is in the range of about 1.70 m, and the width B is in the range of about 3.20 m.

The floor 2 is constructed generally similarly to a conventional freight loading floor. The framework of the floor 2 essentially comprises a plurality of lengthwise beams or girders 6A to 6F, on which freight loading elements such as roller sets 7A to 7F are preferably mounted, in order to allow the freight containers 4 and 4' to be easily moved within the freight compartment 5. A plurality of crosswise beams or girders 8 are arranged substantially perpendicularly to the lengthwise girders 6A to 6F, whereby the lengthwise girders 6A to 6F and the crosswise girders 8 together form a grid-like framework. The crosswise girders 8 serve to brace or support the freight compartment floor 2, and are interconnected with the lengthwise girders 6A to 6F at intersection points 9. Floor plates or panels 32, which are commonly used in aircraft construction, form the walkable surface of the floor 2 between the roller sets 7A to 7F. A support structure 10 made up of support members 11 supports the floor framework and connects it to the fuselage belly 1.

A plurality of support struts 12 and 12' are provided primarily to support and brace the upper deck floor structure 13. Because the support struts 12 and 12' pass through the lower deck 3, they are arranged as far as possible away from the fuselage center line so that they still provide the necessary support for the upper deck floor structure 13, without substantially limiting the usable space, i.e. the usable width, of the lower deck 3.

As mentioned above, FIG. 1 shows the lower deck 3 equipped or outfitted with a freight compartment 5. However, it is the aim to enable the flexible reconfiguration and re-equipping of the lower deck 3 with standard passenger facility modules, such as modules containing seats, sleeping compartments or berths, galleys, lounges, rest rooms or the like, depending on the transport requirements at hand at any time. However, the height H of the lower deck provided to accommodate standard freight containers is less than the necessary standing height HS for passengers and flight attendants who will be using the passenger facilities in the lower deck. Thus, measures must be taken to achieve a standing height HS in the lower deck 3.

At least certain depressed or dropped areas 14 are provided in the floor 2 so as to provide the necessary standing height HS, for example a height of at least 180 cm and preferably at least 195 cm, in the area of an aisle 16. In order to form the depressed floor area 14, the crosswise girders 8 in this area extend substantially in a U-shape. This U-shape is preferably provided in each of the plurality of crosswise girders 8 along one lengthwise area between two adjacent lengthwise girders, for example lengthwise girders 6A and 6B. In this manner, the roller sets 7A and 7B arranged along the girders 6A and 6B are retained, as necessary for the transport of freight containers 4 and 4'. Also thereby, the depressed area 14 is provided in the lower deck floor 2 at least over the lengthwise portion of the lower deck that is to be equipped with passenger facility modules.

Another advantage of the embodiment described above is that the intersection points or connection points 9 between the lengthwise girders 6 and the crosswise girders 8, as well as the force transfer points from the floor structure 2 through the support elements 11 and into the fuselage belly 1 are maintained, so that the structural integrity of the floor structure 2 is maintained. For this reason, the present invention can be retrofitted in existing aircraft without great problems, expense or effort, as well as being used in the new construction of aircraft.

The side shanks 8B and 8B' of the U-shape are angled toward each other so that their direction of extension forms a V-shape matching the angle of the support elements 11. The center cross shank of the U-shape forms the depressed or dropped cross support member 8A, forming the depressed floor area 14 below the major plane of the deck floor 2, thus providing the standing height HS. With such an embodiment of the lower deck floor 2, it remains directly possible to use the lower deck 3 in the normal fashion as a freight compartment or cargo hold 5. Because the functional components of the freight loading system, such as the roller sets 7A to 7F for example, have not been altered, it remains possible to transport standard freight containers 4 and 4' in the usual manner, without difficulty.

In the area of the freight loading doors, the freight loading floor includes various freight loading elements or functional components of the freight loading system in addition to the roller sets 7A to 7F. For example, ballbearing platforms that allow a freight container 4 or 4' to be moved in any desired direction to facilitate loading and unloading are mounted on the floor. To arrange such additional freight loading elements in the depressed floor area 14, the invention provides special modules that are to be inserted into the depressed area 14 to form a substantially plane floor surface in this area. The plane surface of the special modules is then equipped with the additional freight loading elements. Such special modules are exemplified by the intermediate module 24, as shown and described with reference to FIG. 5.

Figure 2:
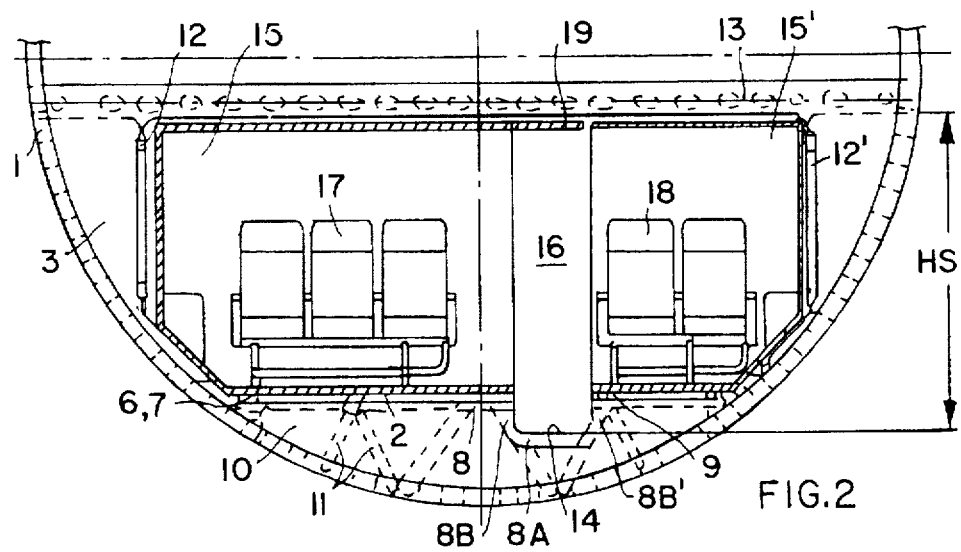
FIG. 2 is a cross-sectional view of the same lower deck structure as shown in FIG. 1, but having passenger cabin modules installed therein.

FIG. 2 shows that the lower deck 3 according to FIG. 1 can be reconfigured or re-equipped as needed, to contain passenger facilities in at least a portion or area of the lower deck 3, while other areas of the lower deck may be used as freight compartments. More particularly, passenger modules 15 and 15' are simply arranged in the lower deck 3 instead of the freight containers 4 and 4'. A stairway would be provided to allow passenger access from the upper deck 33 to the lower deck 3, i.e. to the passenger modules 15 and 15', in any manner known in the art.

In order to carry out such a re-equipping of the lower deck 3, the passenger modules 15 and 15' are simply moved into the lower deck 3, arranged in prescribed positions and then locked in place using the standard freight loading fixtures or additional fixing members. An aisle 16 is provided in the depressed area 14 of the floor 2, whereby the aisle 16 extends between the passenger modules 15 and 15'. In this embodiment the passenger module 15 is equipped with triple seat units 17 and the passenger module 15 is equipped with double seat units 18, and a plurality of seating rows are arranged one behind another in the lengthwise direction of the aircraft. The aisle 16 has a minimum acceptable width between the passenger modules 15 and 15' in order to enable comfortable passage through the aisle for passengers, and has the above described required standing height HS. Each module 15 and 15' is equipped with all of the components necessary in a passenger cabin, and it is simply necessary to provide additional cover panels to join the adjacent modules 15 and 15' in the area of the aisle 16, for example using a ceiling panel 19.

Figure 3:
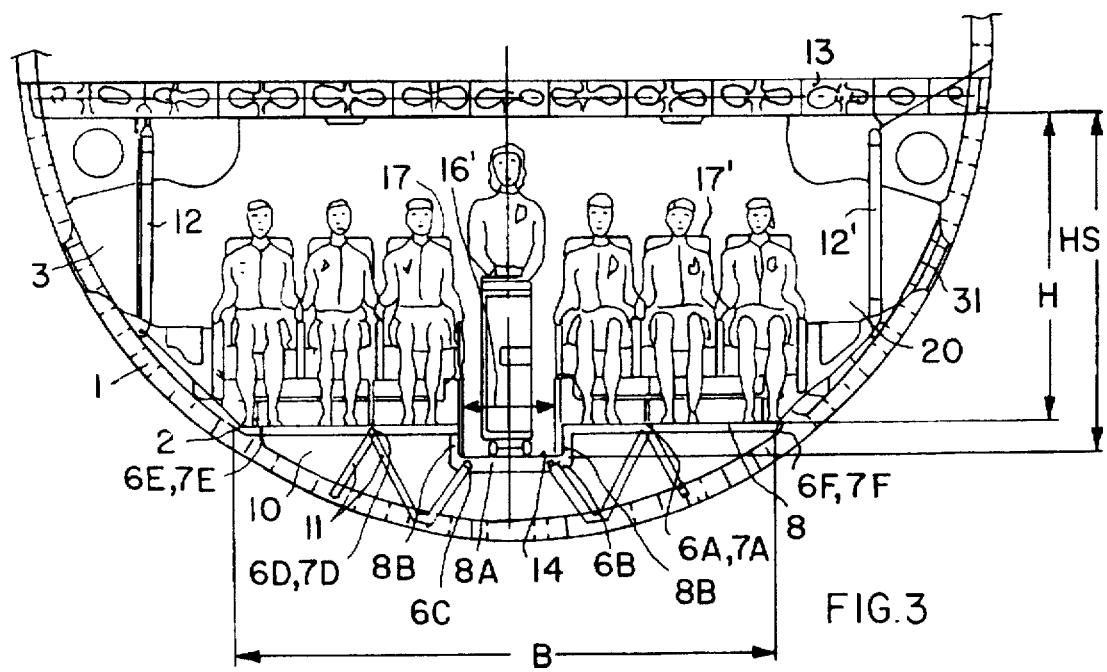
FIG. 3 is a cross-sectional view of a second embodiment of a lower deck structure according to the invention, containing at least one passenger cabin module.

FIG. 3 shows a second embodiment of the lower deck 3 equipped with a passenger cabin module 20. The basic construction of the lower deck 3 corresponds essentially to that shown and described in conjunction with FIG. 1. However, in this second embodiment, a depressed area 14 is provided substantially along the center line of the lower deck floor 2. The crosswise girder 8 has a substantially U-shaped depressed area, whereby the side shanks 8B, 8B' of the U-shape extend substantially vertically, and the crosswise shank 8A of the U-shape forms the depressed horizontally extending cross support member 8A forming the floor of the depressed area 14. The lengthwise girders 6A to 6F and the crosswise girders 8 together form a grid-like framework similar to that described above. However, in contrast to the first embodiment, two lengthwise girders 6B and 6C are depressed or dropped downward together with the depressed cross girder 8A. The depressed lengthwise girders 6B and 6C are not equipped with roller sets 7B and 7C. In this manner, the depressed area 14 of the floor 2 can have an increased width, which is not limited by the spacing between two adjacent ones of the lengthwise girders 6A to 6F. In this manner, the passenger module 20 can have a relatively wide aisle 16', which is wide enough for normal passenger service trolleys and the like, and to provide passenger seating 17 and 17' on both sides of the aisle. The standing height HS is realized in the area of the aisle 16'. Windows 31 can be provided through the fuselage belly 1, to give the passengers in the lower deck an outside view.

As one alternative, the passenger cabin module 20 can be rigidly and at least semipermanently installed in the lower deck 3, if it is desired that the lower deck 3 should permanently include a passenger cabin 20, either over the entire lower deck or in just a portion of the lower deck adjacent to a cargo hold 5 equipped with the standard freight loading floor. On the other hand, the passenger cabin module 20 can be embodied to be removable, and the missing roller sets 7B and 7C can be installed thereafter, so that the lower deck 3 can be reconfigured or re-equipped to provide a larger freight compartment. This can be achieved by installing auxiliary rails or insert elements in the depressed area 14 of the floor 2, whereupon the roller sets are secured.

Figure 4:
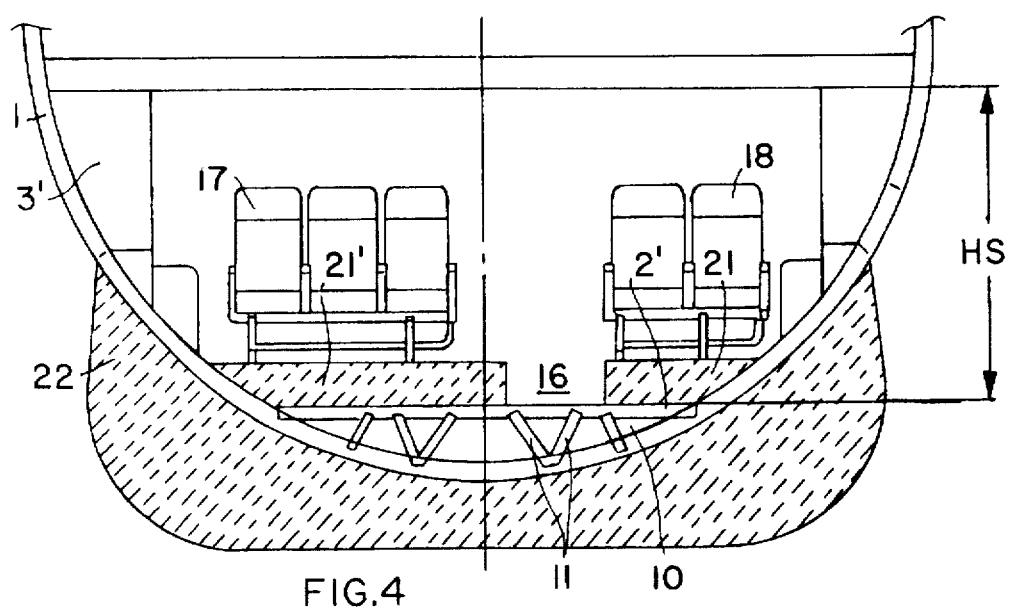
FIG. 4 is a cross-sectional view of a third embodiment of a lower deck structure according to the invention, equipped with another variation of at least one passenger cabin module.

FIG. 4 shows a further embodiment of a lower deck 3' according to the invention. In this third embodiment, the entire lower deck floor 2' is dropped or depressed. The structure of the floor 2' is substantially the same as described above for the lower deck floor 2, except that the present floor 2' is moved closer to the bottom of the fuselage belly. Thus, the floor 2' essentially comprises a grid-like framework of lengthwise and crosswise girders, with conventional floor panels supported by the girders to form the walkable areas of the floor. A support structure 10 of support elements 11 supports the lower deck floor 2' and connects it to the fuselage belly 1.

In the embodiment shown in FIG. 4, the lower deck floor 2' does not include the functional freight loading elements, such as roller sets, which are necessary for moving and storing freight containers. Furthermore, because the floor 2' is depressed or dropped in the fuselage, it does not provide a sufficient width to receive standard freight containers. On the other hand, the depressed floor 2' increases the usable volume of the lower deck 3' as a passenger cabin having a normal standing height HS for passengers. To help protect a survival space or safety cage for passengers within the lower deck 3' in the event of a crash, an energy absorbing structural unit 22 is arranged outside the fuselage belly 1, at least in the area of the fuselage at which passenger cabins are provided. To increase the strength and the usable width of the floor, floor modules 21 and 21', preferably made of an energy absorbing material, are fixed on the lower deck floor 2'. These floor modules 21 and 21' are arranged in the areas below the triple seat rows 17 and the double seat rows 18. The aisle 16 provided between the seating groups is not equipped with floor modules, so the standing height HS is not reduced.

Figure 5:
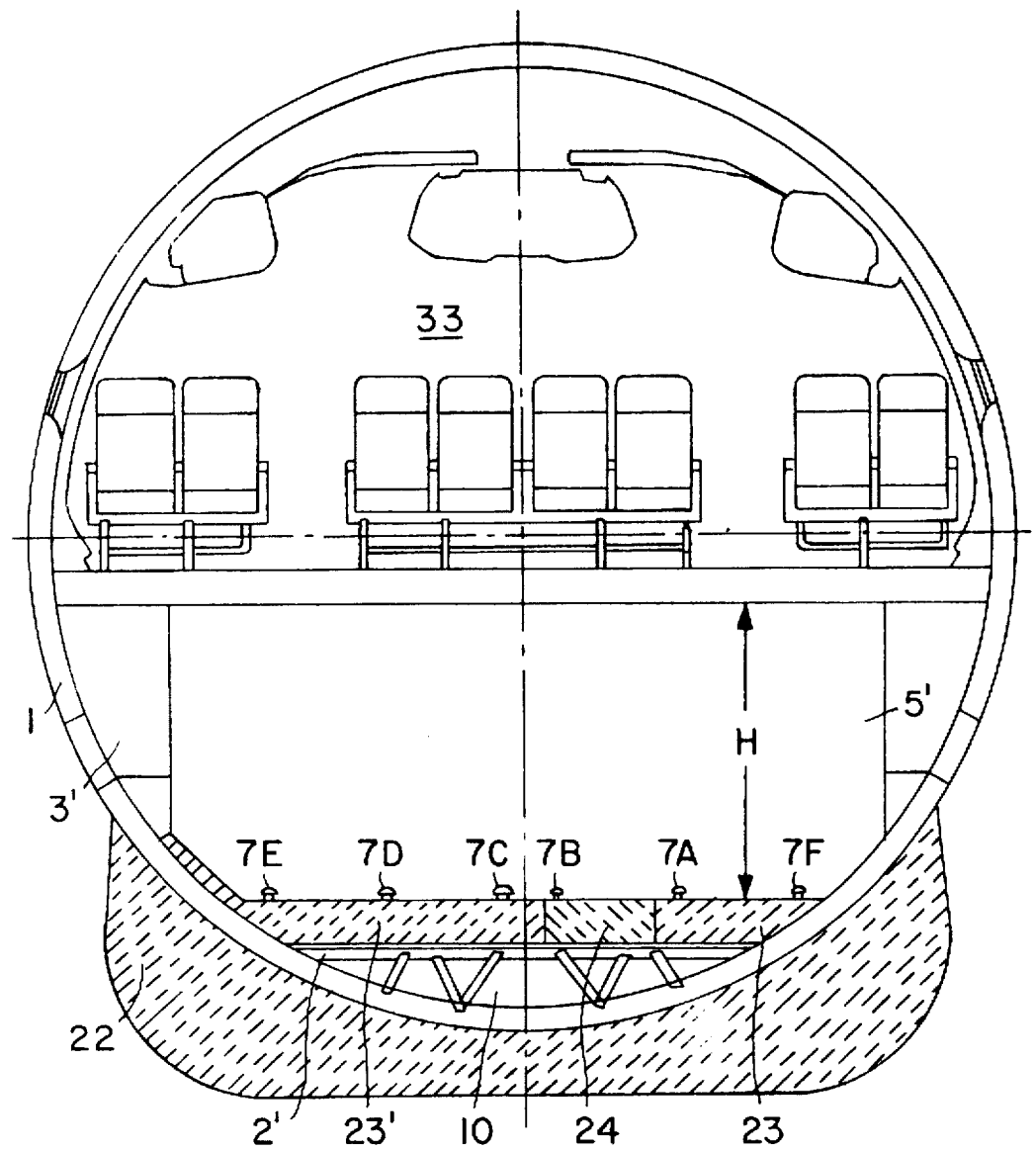
FIG. 5 is a cross-sectional view of the entire fuselage of an aircraft having the lower deck structure of the third embodiment shown in FIG. 4, but outfitted as a cargo hold.

FIG. 5 shows the lower deck 3' generally according to FIG. 4, but reconfigured and re-equipped as a freight compartment or cargo hold 5'. As described above with reference to FIG. 4, the floor 2' is completely depressed, but floor modules are installed on top of the floor 2' to provide a freight loading surface at a proper level within the fuselage to achieve a free clearance height H and maximum usable width-necessary for standard freight containers in the cargo hold 5'. The floor modules installed on the floor 2' can be the same floor modules 21, 21' as shown in FIG. 4, onto which the necessary roller sets 7A to 7F have been installed. Alternatively, the floor modules 21 and 21' shown in FIG. 4 can be removed and replaced with freight loading floor modules 23 and 23' which already include all of the necessary functional components of the freight loading system, such as the roller sets 7A to 7F. An intermediate filler module 24 fills the area that was provided as an aisle 16 in the embodiment of FIG. 4. An additional roller set 7B may be installed on the intermediate filler module 24 if required. The floor modules 23, 23' and 24 have a proper thickness to provide the required height H for a standard freight loading floor and the largest possible usable width within the cargo hold 5'.

The above described manner of modular construction achieves a great flexibility and convenience in reconfiguring and re-equipping lower deck areas from a cargo hold configuration to a passenger space configuration and vice versa. The modules 21, 21', 23, 23' and 24 are secured in place by conventional plug-in or screw connectors, which allow quick reconfiguration and re-equipping of the lower deck 3, 3' and also short installation times.

Although the invention has been described with reference to specific example embodiments, it will be appreciated that it is intended to cover all modifications and equivalents within the scope of the appended claims.

What is claimed is:

1. A passenger aircraft comprising a fuselage having a substantially circular cross-section, an upper deck floor arranged within said fuselage and defining an upper deck space within said fuselage above said upper deck floor, a lower deck floor arranged within said fuselage below said upper deck floor and defining a lower deck space within said fuselage between said lower deck floor and said upper deck floor, and a support structure comprising support elements arranged to support said lower deck floor against said fuselage, wherein said lower deck space is adapted to receive at least a freight container or a passenger facility module, wherein said lower deck floor comprises a grid framework including lengthwise girders and crosswise girders, and floor plates arranged on said grid framework, wherein said lower deck floor includes at least a dropped floor portion that is arranged at a sufficient spacing from said upper deck floor to provide a free height in said lower deck space at least equal to a normal standing height of a person, wherein at least one of said crosswise girders comprises a substantially U-shaped portion at said dropped floor portion, and wherein said U-shaped portion comprises two side shanks extending generally in the direction of said fuselage and a crosswise shank extending substantially horizontally as a crosswise floor support below the major plane of said lower deck floor.

2. The aircraft of claim 1, wherein said free height in said lower deck space is at least 180 cm.

3. The aircraft of claim 1, wherein said free height in said lower deck space is at least 195 cm.

4. The aircraft of claim 1, further comprising freight loading elements mounted on at least one of said lengthwise girders.

5. The aircraft of claim 4, wherein said freight loading elements comprise roller sets.

6. The aircraft of claim 1, wherein said dropped floor portion forms an aisle for passenger use.

7. A passenger aircraft comprising a fuselage having a substantially circular cross-section, an upper deck floor arranged within said fuselage and defining an upper deck space within said fuselage above said upper deck floor, a lower deck floor arranged within said fuselage below said upper deck floor and defining a lower deck space within said fuselage between said lower deck floor and said upper deck floor, and a support structure comprising support elements arranged to support said lower deck floor against said fuselage, wherein said lower deck space is adapted to receive at least a freight container or a passenger facility module, wherein said lower deck floor comprises a grid framework including lengthwise girders and crosswise girders, and floor plates arranged on said grid framework, wherein said lower deck floor in its entirety is arranged at a sufficient spacing from said upper deck floor to provide a free height at least equal to a normal standing height of a person in said lower deck space at all locations of said lower deck floor, further comprising floor modules arranged on at least a portion of said lower deck floor, wherein said floor modules are not arranged on said lower deck floor at an area to form an aisle, and further comprising an intermediate filler module arranged on said lower deck floor at said area of said aisle, and freight loading elements mounted on said intermediate filler module.

8. The aircraft of claim 1, wherein said U-shaped portion of said crosswise girder is arranged between an adjacent pair of said lengthwise girders, and wherein said side shanks extend in directions with a V-shaped angle therebetween, with each of said shanks substantially parallel to one of said support elements.

9. The aircraft of claim 1, wherein said U-shaped portion of said crosswise girder is arranged at least approximately at a center plane of said fuselage, wherein said side shanks extend substantially vertically, and wherein at least one of said lengthwise girders includes at least a dropped portion that is arranged at said dropped floor portion below the major plane of said lower deck floor.

10. The aircraft of claim 9, further comprising first freight loading elements arranged on said lengthwise girders other than said lengthwise girder dropped portion, an insert component arranged at said dropped floor portion, and second freight loading elements arranged on said insert component in a common plane with said first freight loading elements.

11. The aircraft of claim 1, further comprising an energy-absorbing structural component arranged outside and below said fuselage.

12. The aircraft of claim 7, further comprising passenger facility components mounted on said floor modules.

13. The aircraft of claim 12, wherein said passenger facility components are selected from the group consisting of passenger seats, passenger sleeping berths, lounge facilities, rest room facilities and galley facilities.

14. The aircraft of claim 7, wherein said lower deck space includes a cargo hold and a passenger compartment, further comprising freight loading elements mounted on said floor modules in said cargo hold and passenger facility components mounted on said floor modules in said passenger compartment.

15. The aircraft of claim 7, further comprising freight loading elements mounted on said floor modules to form a freight loading floor, wherein said floor modules have a proper thickness for achieving a maximum width of said freight loading floor and minimum height of said lower deck space as necessary for storing standard freight containers on said freight loading floor.

16. The aircraft of claim 15, wherein said freight loading elements comprise roller sets.

17. The aircraft of claim 7, wherein said free height in said lower deck space is at least 195 cm.

18. The aircraft of claim 7, further comprising freight loading elements mounted on at least one of said lengthwise girders.

19. The aircraft of claim 7, further comprising an energy-absorbing structural component arranged outside-and below said fuselage.

20. The aircraft of claim 7, wherein said free height in said lower deck space is at least 180 cm.

* * * * *